(12) United States Patent
Pang

(10) Patent No.: US 6,664,304 B2
(45) Date of Patent: Dec. 16, 2003

(54) PROCESS FOR PRODUCING FINE RUBBER POWDER BY USING WASTE RUBBER

(76) Inventor: Shuhua Pang, Room 2208, Huiya Mansion, 12 East Road, North Sanhuan, Chaoyang District, Beijing 100013, P.R. (CN)

( * ) Notice: Subject to any disclaimer, the term of this patent is extended or adjusted under 35 U.S.C. 154(b) by 144 days.

(21) Appl. No.: 09/838,180

(22) Filed: Apr. 20, 2001

(65) Prior Publication Data

US 2001/0036969 A1 Nov. 1, 2001

(30) Foreign Application Priority Data

Apr. 26, 2000 (CH) .......................................... 00106144

(51) Int. Cl.⁷ ................................................. C08J 11/04
(52) U.S. Cl. ........................ 521/44; 521/40.5; 521/45.5
(58) Field of Search ............................. 521/40, 41, 44, 521/45.5, 42.5; 264/912

(56) References Cited

U.S. PATENT DOCUMENTS 4,506,034 A * 3/1985 Munih .......................... 521/41
5,304,576 A * 4/1994 Martinez ..................... 521/41
6,380,269 B1 * 4/2002 Benko et al. ................. 521/41

FOREIGN PATENT DOCUMENTS

| JP | 66013616 B | * | 1/1968 |
| WO | WO 01/10942 A1 | * | 2/2001 |

* cited by examiner

Primary Examiner—Edward J. Cain
Assistant Examiner—Katarzyna Wyrozebski Lee
(74) Attorney, Agent, or Firm—McDermott, Will & Emery

(57) ABSTRACT

This invention provides a process for producing fine rubber powders by using waste rubber, comprising the steps of pre-pulverizing waste rubber into particles with a size of 1–4 mm; soaking the particles in a solvent selected from one or more alcohols and/or ethers; and pulverizing the soaked rubber particles into rubber powders with a size of less than 180 $\mu$m. The process according to the invention is an ideal method in industry due to its low costs and without pollution.

5 Claims, 1 Drawing Sheet

PROCESS FOR PRODUCING FINE RUBBER POWDER BY USING WASTE RUBBER

FIELD OF THE INVENTION

The present invention relates to the recycle of industrial wastes, especially to a process for producing fine rubber powder by using waste rubber.

BACKGROUND OF THE INVENTION

Vulcanized natural rubber and synthetic rubber (referred to as waste rubber) are polymer elastic materials, which are considered difficult to be recycled. The effective treatment and recycling of waste rubber is beneficial to protection of ecological environment and for saving of natural resources.

One of the methods for recycling waste rubber is to make it into rubber powder, which can be mixed into raw rubber materials to replace part of rude rubber. If fine rubber powder is used with a proper proportion in the materials, the shrinkage and ductility of the rubber materials as well as some properties of the rubber product can be improved. Rubber powder can be also used as an additive of building materials. In practice, the particle size of the rubber powder for the above applications is less than 180 $\mu$m, which is referred to as a fine rubber powder.

At present, the industrial process for producing the rubber powder is a method of the ambient temperature pulverization and a method of the freezing pulverization. The former is conducted by means of shearing and cutting force of rollers to pulverize waste rubber. The size of most of resultant rubber powders is of 300 $\mu$m–600 $\mu$m, and that of 180 $\mu$m, less than 5%. Although such rubber powder has a burry surface, which is beneficial to its combination with other materials, the amount of the rubber powder in use has to be reduced because the larger size of the rubber powder reduces its function in practical use. In the latter method, the rubber powder obtained by the former method is tenderized at a freezing temperature before being continuously sheared and cut. Such method can produce rubber powders at a size of 250–500 $\mu$m, and those at a size of below 180 $\mu$m of around 20%. In addition, the smooth surface of such rubber powder makes it difficult combine with other materials. Both the above-mentioned methods have the disadvantages of high assumption of energy, a high investment, a low yield of fine rubber powder and high costs of production.

SUMMARY OF THE INVENTION

The present invention provides a method for producing fine rubber powders at ambient temperature so as to overcome the above-mentioned technical drawbacks in the prior art.

A process according to the present invention comprises:
a) pre-pulverizing waste rubber into particles with a size of 1–4 mm;
b) soaking the particles in a solvent selected from one or more alcohols and ethers; and
c) pulverizing the soaked rubber particles into rubber powders with a size of less than 180 $\mu$m.

With the process in the present invention, fine rubber powders with a size of less than 180 $\mu$m can be produced at ambient temperature at a yield of 100%.

DETAILED DESCRIPTION OF INVENTION

Figure 1:
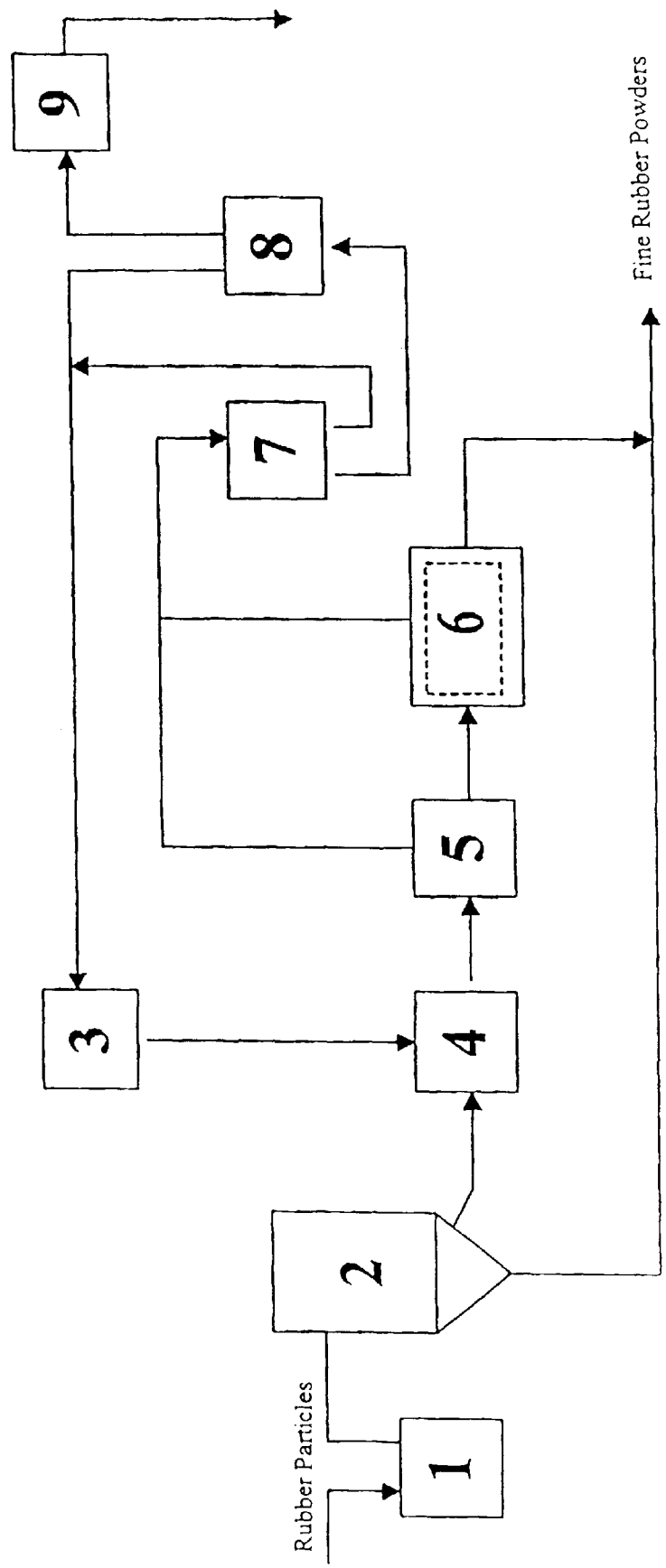
FIG. 1 is the flow chart according to the process of this invention.

According to the invention, the process comprises:
a) pre-pulverizing waste rubber into particles with a size of 1–4 mm;
b) soaking the particles in a solvent selected from one or more alcohols and ethers; and
c) pulverizing the soaked rubber particles into rubber powders with a size of less than 180 $\mu$m.

Said alcohols and ethers in step b) usually refer to aliphatic alcohols and aliphatic ethers with less than 20 carbon atoms. In this invention, the aliphatic alcohols are preferably selected from the group consisting of n-butyl alcohol, i-butyl alcohol and cyclohexanol, and the aliphatic ethers are preferably selected from the group consisting of n-butyl ether, dichloroethyl ether and ethylene glycol butyl ether.

The time for soaking the rubber particles depends on a solvent and the type of waste rubber used in the invention. Usually, the soak lasts from 30 seconds to 10 minutes.

In step c), a pulverizing machine with strong cutting and grinding power is used. The soaked rubber can be easily treated to be fine rubber powders in this step.

After being processed in step c), the fine rubber powders still comprise residual solvent, which can be vaporized in a drying step. The vaporized solvent gas can be drawn out for cooling to liquidize at a temperature of 0–20° C. before flowing back to a soaking container for cyclic use. The drying step is also a part of this invention (step d) in the invention). The temperature for drying the fine rubber powders depends on the boiling point of the used solvent, and is above the boiling point of the solvent.

In the process of this invention, the pre-pulverizing of mechanic roller is used to pulverize waste rubber into small particles. Such a step is beneficial to the permeation of the solvent into rubber particles and shortens the time for soaking the rubber particles. Since the fine rubber powders produced have a burry surface, it is easy to mix with other materials. Accordingly, 20–30% of such fine rubber powders can be mixed with raw rubber powders for manufacturing tyres and 50–60% of the same can be mixed with raw rubber powders for producing rubber shoes, rubber pipes and rubber belts. The use of mixing the fine rubber powders can not only guarantee the physical and mechanical property, but also reduce the costs of rubber products. It is easy to get solvents used in the process of this invention, and there are no strict requirements for purity of the solvents. What is more, the solvents can be recycled in an airtight system.

With reference to the drawings, this invention will be further described in detail.

As shown in FIG. 1, the waste rubber is pre-pulverized into particles of 1–4 mm by a rolling machine 1 with a strong shearing and cutting force. Those pulverized rubber particles below 180 $\mu$m are separated by a cyclone 2 and transmitted directly to a stored tank of finished products. Those rubber particles bigger than 180 $\mu$m are transmitted into a mixing groove 4 where they are mixed with a combined solvent consisting of n-butyl ether and i-butyl alcohol from a solvent groove 3. After being stirred, the rubber particles soaked with the solvent are transmitted into a pulverizing machine 5, in which they are further pulverized into fine powders. Then, the fine rubber powders are transmitted into a drying groove 6, where most of the residual solvent of n-butyl ether and i-butyl alcohol is volatilized at a temperature of 50–80° C. and the dry fine rubber powders below 180 $\mu$m are produced.

By means of adjusting the machine 1, the size of the finished fine rubber powders can be controlled below 150

μm, below 120 μm and even below 75 μm. A condenser 7 and the pulverizing machine 1 as well as the drying groove 6 are installed inside the airtight system, the volatile solvent is dawn into the condenser 7 under a vacuum device. Uncondensed solvent is drawn into an absorbing device 8, where it is condensed, absorbed and introduced into the stored tank 3 for cycling use.

What I claim is:

1. A process for producing fine rubber powders at ambient temperatures by using waste rubber comprising the following steps of:
    a) pre-pulverizing waste rubber by a mechanical roller into particles with a size of 1–4 mm;
    b) soaking the particles in a solvent selected from one or more alcohols and/or ethers from 30 seconds to 10 minutes; and
    c) pulverizing the soaked rubber particles into rubber powders with a size of less than 180 μm.

2. The process according to claim 1, wherein the process further comprises the following step of:
    d) drying the pulverized fine rubber powders.

3. The process according to claim 1, wherein said alcohols are selected from aliphatic alcohols with less than 20 carbon atoms and said ethers are selected from aliphatic ethers with less than 20 carbon atoms.

4. The process according to claim 3, wherein said aliphatic alcohols comprise n-butanol, i-butanol and cyclohexanol.

5. The process according to claim 3, wherein said aliphatic ethers comprise n-butyl ether, dichloroethyl ether and ethylene glycol butyl ether.

\* \* \* \* \*